(12) United States Patent
Sakai

(10) Patent No.: US 8,511,731 B2
(45) Date of Patent: Aug. 20, 2013

(54) VEHICLE PARTITION SIDE MEMBER STRUCTURE

(75) Inventor: Naoki Sakai, Hamamatsu (JP)

(73) Assignee: Suzuki Motor Corporation (JP)

( * ) Notice: Subject to any disclaimer, the term of this patent is extended or adjusted under 35 U.S.C. 154(b) by 42 days.

(21) Appl. No.: 13/217,742

(22) Filed: Aug. 25, 2011

(65) Prior Publication Data

US 2012/0049557 A1 Mar. 1, 2012

(30) Foreign Application Priority Data

Aug. 30, 2010 (JP) ................................. 2010-192007

(51) Int. Cl.
*B62D 25/08* (2006.01)

(52) U.S. Cl.
USPC .................. 296/24.4; 296/193.02; 296/203.04

(58) Field of Classification Search
USPC ..................... 296/203.03, 29, 70, 24.4, 24.43, 296/24.44, 24.45, 186.3, 191, 193.02, 203.04, 296/37.1, 37.16, 37.13, 37.14, 37.15, 76, 296/146.11, 146.8, 56; 16/296, 298
See application file for complete search history.

(56) References Cited

U.S. PATENT DOCUMENTS 5,967,586 A * 10/1999 Duffy et al. ...................... 296/76
7,325,865 B2 * 2/2008 Yamazaki ................. 296/203.04
2004/0245807 A1 12/2004 Yakata et al.
2006/0119140 A1 6/2006 Yamazaki
2007/0075568 A1 * 4/2007 Kim et al. ................ 296/203.04

FOREIGN PATENT DOCUMENTS

| DE | 102004013602 A1 | 10/2004 |
| JP | 08276865 A * | 10/1996 |
| JP | 2006256351 A * | 9/2006 |
| JP | 2009023367 A | 2/2009 |
| JP | 2009101975 A | 5/2009 |

OTHER PUBLICATIONS

German Office Action for Application No. 102011112197.1 dated Dec. 10, 2012.

* cited by examiner

*Primary Examiner* — Jason S Morrow
*Assistant Examiner* — E Turner Hicks
(74) *Attorney, Agent, or Firm* — Lerner, David, Littenberg, Krumholz & Mentlik, LLP

(57) ABSTRACT

A partition side member structure includes a partition panel, partition side panels joined to both right and left sides of the partition panel, and a partition reinforcement joined to backsides of the partition panel and the partition side panels. The partition side panels are divided in a vehicle front-rear direction into two partition side panels, which are front and rear partition side panels, by a dividing line extending in a vehicle width direction on a substantially horizontal plane formed of joining portions of the front and rear partition side panels. An upper part of the partition reinforcement is joined to a front portion of the rear partition side panel bent downward and a lower part of the partition reinforcement is joined to a lower portion of the front partition side panel bent downward.

10 Claims, 5 Drawing Sheets

VEHICLE PARTITION SIDE MEMBER STRUCTURE

CROSS-REFERENCE TO RELATED APPLICATIONS

The present application claims the benefit of Japanese Patent Application No. 2010-192007, filed Aug. 30, 2010, the disclosure of which is incorporated by reference herein.

BACKGROUND OF THE INVENTION

1. Field of the Invention

The present invention particularly relates to a structure of a partition side member of a notchback type vehicle.

2. Description of Related Art

In a vehicle, a partition panel is provided at a rear part of a vehicle body in order to partition the vehicle body into a vehicle interior and a luggage compartment (a luggage space or a trunk space). This partition panel is located at a vertically middle position in the rear part of the vehicle body and has a function of a component that contributes to the vehicle body rigidity, that is, torsional rigidity, in particular, of the rear part. In other words, an improvement in rigidity of the partition panel enables improvement in driving stability of the vehicle and noise reduction in the vehicle interior. For this reason, there is a demand for a partition panel having higher rigidity in itself, and also having higher joint rigidity at vehicle-body side quarter panels and the like joined to both the right and left sides of the partition panel.

Moreover, it is important to secure the joint rigidity of both the right and left ends of the partition panel and side panels. This is because the partition panel has an effect of preventing deformation of the side panels when attachment bolts for attaching seat belt guides are pulled obliquely, i.e., forwardly and downwardly of the vehicle body with loads applied by seat belts for restraining the bodies of passengers. By securing this joint rigidity, it is possible to mitigate local deformation of the vehicle body and to disperse the loads to peripheral panels.

Accordingly, among conventional vehicle body structures, there is a structure, as disclosed in JP 2009-101975 A, in which partition side panels separated from a partition panel are joined to both the right and left end sides of the partition panel to achieve improvement in rigidity on both the right and left sides of the partition panel while avoiding an increase in weight. Moreover, in order to achieve further improvement in rigidity, this vehicle body structure employs a structure in which a partition reinforcement is attached to backsides (vehicle rear side) of the partition side panels to form closed cross sections at both end sides of the partition reinforcement when viewed in a vehicle width direction and in a vehicle vertical direction.

In addition, JP 2006-256351 A discloses a structure in which a partition side panel is divided into an upright wall portion located on a vehicle front side thereof and a horizontal portion located on a vehicle rear side thereof, and a reinforcement member is provided between the upright wall portion and a partition panel. In this way, it is possible to improve the rigidity on both the right and left sides of the partition panel and to improve the joint rigidity of the upright wall portion and a closed cross section portion provided on the front side of the partition panel.

Furthermore, JP 8-276865 A discloses a structure in which the rigidity is improved in such a way that a closed cross section is formed by installing a panel having a "dogleg" cross-section shape to the vehicle front side of a partition side panel.

However, the conventional vehicle body structures as described above cannot achieve improvement in the rigidity of the closed cross section unless the panels that form the closed cross section are firmly joined together. For this reason, in the above-described conventional vehicle body structures, the panels for forming the closed cross section need to be joined together by spot welding with no intervals, or by other similar processing.

Nevertheless, a notchback type vehicle which has a trunk compartment at a rear part of the vehicle generally employs a structure in which a door of the trunk compartment is opened and closed by a rotation operation using hinges, and trunk hinge brackets thereof are attached to both the right and left sides of a partition panel (or to partition side panels in a case in which the partition side panels are provided). A layout of an arm of such a hinge affects a rotation trajectory of opening and closing operations of the trunk door. The layout can be set easily when attachment positions of the trunk hinge brackets and the relative position of the trunk door are appropriate. However, if these positions are not appropriate, the rotation trajectory of the trunk door has a problem, and therefore a complicated link mechanism needs to be employed as a countermeasure. For this reason, certain distances need to be provided between the attachment positions of the trunk hinge brackets and the relative position of the trunk door, and it is important to secure design flexibility for the attachment positions of the hinges. In addition, the trunk hinge brackets receive loads in the opening and closing operations of the trunk door and loads of supports (springs) for opening the trunk door. Therefore, the trunk hinge brackets are required to secure the sufficient attachment rigidity.

For example, in a structure of a closed cross section of a conventional partition reinforcement as shown in FIG. 7, a joining point of a partition side panel 51 and a partition reinforcement 52 is thickly provided. Accordingly, a trunk hinge bracket 53 needs to be provided in a position avoiding the joining point. In this case, the trunk hinge bracket 53 needs to be provided behind a joining flange 52a of the partition reinforcement 52 in the vehicle front-rear direction. Therefore, a distance a between the attachment position of the trunk hinge bracket 53 and a trunk door (not shown) tends to become shorter. Therefore, the trunk hinge brackets may not achieve sufficient attachment rigidity.

SUMMARY OF THE INVENTION

The present invention has been made in view of the foregoing circumstances. An object of the present invention is to provide a structure of a partition side member having the following advantages over a conventional structure. Specifically, the structure of the present invention is capable of: providing increased flexibility of a hinge layout while securing joint rigidity of a partition reinforcement, by allowing a flat portion of a partition panel to be provided closer to a front side of a vehicle than before; having improved rigidity around a closed cross section while avoiding an excessive weight increase; and providing improved rigidity of a vehicle body as a whole in such a way that a vehicle front side of a partition side panel having a large plate thickness is joined to a quarter panel to thereby firmly join a member extending in a vehicle width direction to vehicle body side members.

In order to solve the problem of the conventional technique, the invention provides a structure of a partition side member comprising: a partition panel provided to partition a space into a vehicle interior and a luggage compartment; partition side panels respectively joined to both the right and left sides of the partition panel; and a partition reinforcement joined to backsides of the partition panel and the partition side panels, wherein the partition side panels are each divided in a vehicle front-rear direction into two partition side panels, which are front and rear partition side panels, by a dividing line extending in a vehicle width direction on a substantially horizontal plane formed of joining portions of the front and rear partition side panels, and an upper part of the partition reinforcement is joined to a front portion of the rear partition side panel bent downward and a lower part of the partition reinforcement is joined to a lower portion of the front partition side panel bent downward.

In addition, in the invention, the partition panel and the front partition side panels are joined together at their adjacent portions on both sides in the vehicle width direction of the partition panel, the partition panel and the rear partition side panels are joined together at their adjacent portions on both the sides in the vehicle width direction of the partition panel, and the partition panel and the partition reinforcement are joined together on both the sides in the vehicle width direction of the partition panel.

Moreover, in the invention, a hole for installing a hinge bracket is provided across the dividing line between the front partition side panel and the rear partition side panel.

Furthermore, in the invention, an attaching portion for the hinge bracket is provided at an overlapped portion of the joining portions of the front partition side panel and the rear partition side panel.

Furthermore, in the invention, an attaching portion for the hinge bracket is provided at joining portions of the partition panel and the rear partition side panel.

As described above, the structure of a partition side member according to the invention comprises: a partition panel provided to partition a space into a vehicle interior and a luggage compartment; partition side panels respectively joined to both the right and left sides of the partition panel; and a partition reinforcement joined to backsides of the partition panel and the partition side panels, wherein the partition side panels are each divided in a vehicle front-rear direction into two partition side panels, which are front and rear partition side panels, by a dividing line extending in a vehicle width direction on a substantially horizontal plane formed of joining portions of the front and rear partition side panels, and an upper part of the partition reinforcement is joined to a front portion of the rear partition side panel bent downward and a lower part of the partition reinforcement is joined to a lower portion of the front partition side panel bent downward. Therefore, the joining portion of the partition reinforcement does not interfere with the hinge bracket to be installed on the partition side panel. Thus, the hinge bracket can be located on the flat surface portion of the partition side panel in a position relatively close to the front side of the vehicle, and thereby flexibility of a hinge layout can be increased while joint rigidity of the partition reinforcement is secured.

Here, according to the structure of the present invention, a portion to install the hinge bracket is not joined to the joining portion of the front partition side panel and the rear partition side panel. However, joint rigidity of the vehicle body as a whole is secured because each of the front partition side panel and the rear partition side panel is joined to the partition reinforcement. Moreover, according to the structure of the present invention, rigidity around the closed cross section can be improved by increasing only a plate thickness of the front partition side panel. Therefore, an excessive weight increase can be avoided, the member in the width direction of the vehicle body is firmly joined to the member on the side vehicle body by joining the front partition side panel having the large plate thickness to the quarter panel on the side vehicle body, and thereby rigidity of the vehicle body can be improved. Here, the hinge bracket is a member configured to rotatably support a trunk door by way of a trunk door hinge and the like.

In addition, in the invention, the partition panel and the front partition side panels are joined together at their adjacent portions on both sides in the vehicle width direction of the partition panel, the partition panel and the rear partition side panels are joined together at their adjacent portions on both the sides in the vehicle width direction of the partition panel, and the partition panel and the partition reinforcement are joined together on both the sides in the vehicle width direction of the partition panel. Therefore, each of the four components, that is, the partition panel, the front partition side panel, the rear side partition panel, and the partition reinforcement, is joined to the other three components. Therefore, joint rigidity can be further improved while the design flexibility of the hinge bracket is secured.

Moreover, in the invention, a hole for installing a hinge bracket is provided across the dividing line between the front partition side panel and the rear partition side panel. Therefore, the hinge bracket can be installed even closer to the front side of the vehicle and thereby the design flexibility of the hinge can be secured. Here, as described above, joint rigidity in the configuration of the closed cross section is secured by joining the partition reinforcement to either the front partition side panel or the rear partition side panel. Accordingly, the above-described installation can be achieved without any problems even when joint rigidity is reduced between the front partition side panel and the rear partition side panel.

Furthermore, in the invention, an attaching portion for the hinge bracket is provided at an overlapped portion of the joining portions of the front partition side panel and the rear partition side panel. Therefore, it is possible to bolt on (or to weld) three members by bolting on (or welding) the flange of the hinge bracket by using holes on the two-layered joining portion. Accordingly, joining strength between the front partition side panel and the rear partition side panel is increased. Therefore, it is possible to improve joint rigidity of the members surrounding the closed cross section and to secure rigidity of a bearing surface of the bolt, for example, as well as attachment rigidity of the hinge bracket.

Furthermore, in the invention, an attaching portion for the hinge bracket is provided at joining portions of the partition panel and the rear partition side panel. Therefore, it is possible to secure attachment rigidity of the hinge bracket on the vehicle rear side and on the inside in the vehicle width direction, as well as to secure attachment rigidity of the hinge bracket on the vehicle front side and on the inside in the vehicle width direction. In this way, it is possible to receive loads at the time of opening and closing operations of the trunk door by use of attachment rigidity of the hinge bracket in a vehicle front-rear direction. Accordingly, the loads can be absorbed efficiently.

DETAILED DESCRIPTION OF PREFERRED EMBODIMENTS

Figure 1:
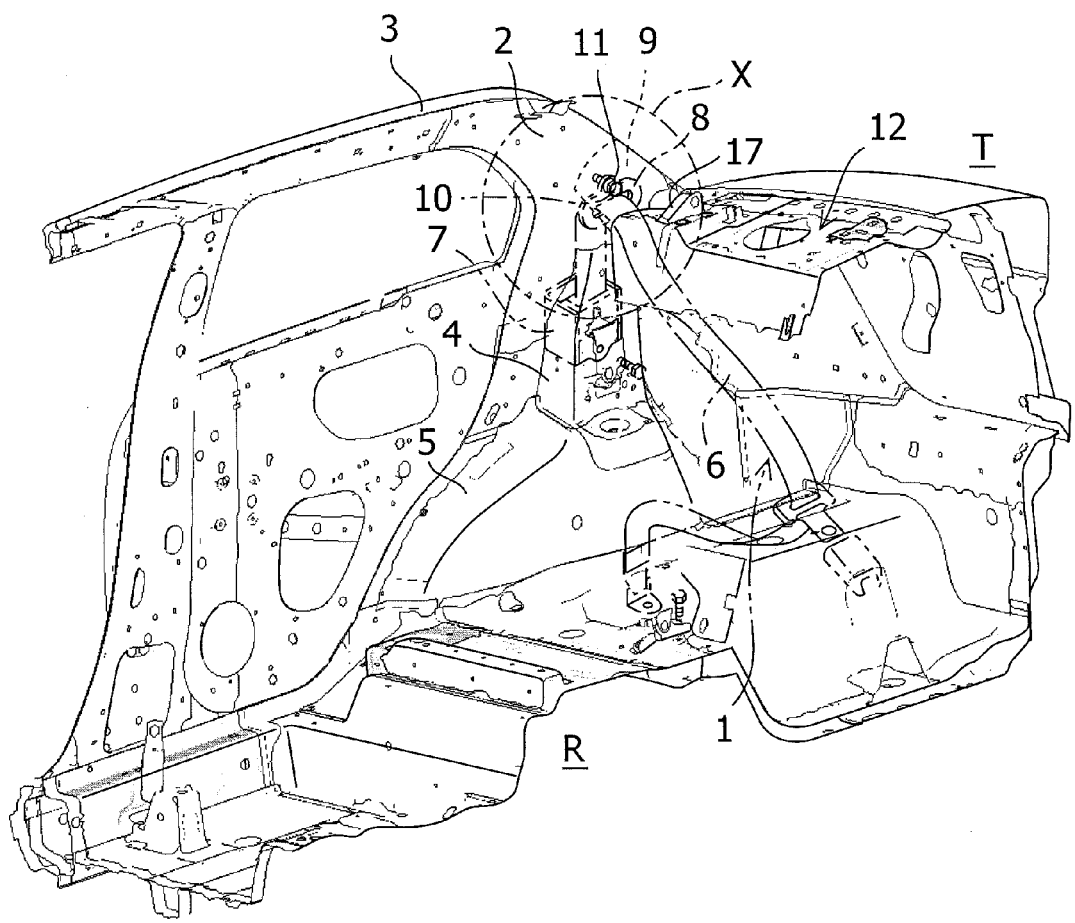
FIG. 1 is a perspective view showing part of a rear side vehicle body of a vehicle employing a structure of a partition side member according to an embodiment of the present invention, which is viewed from a vehicle interior.
Figure 2:
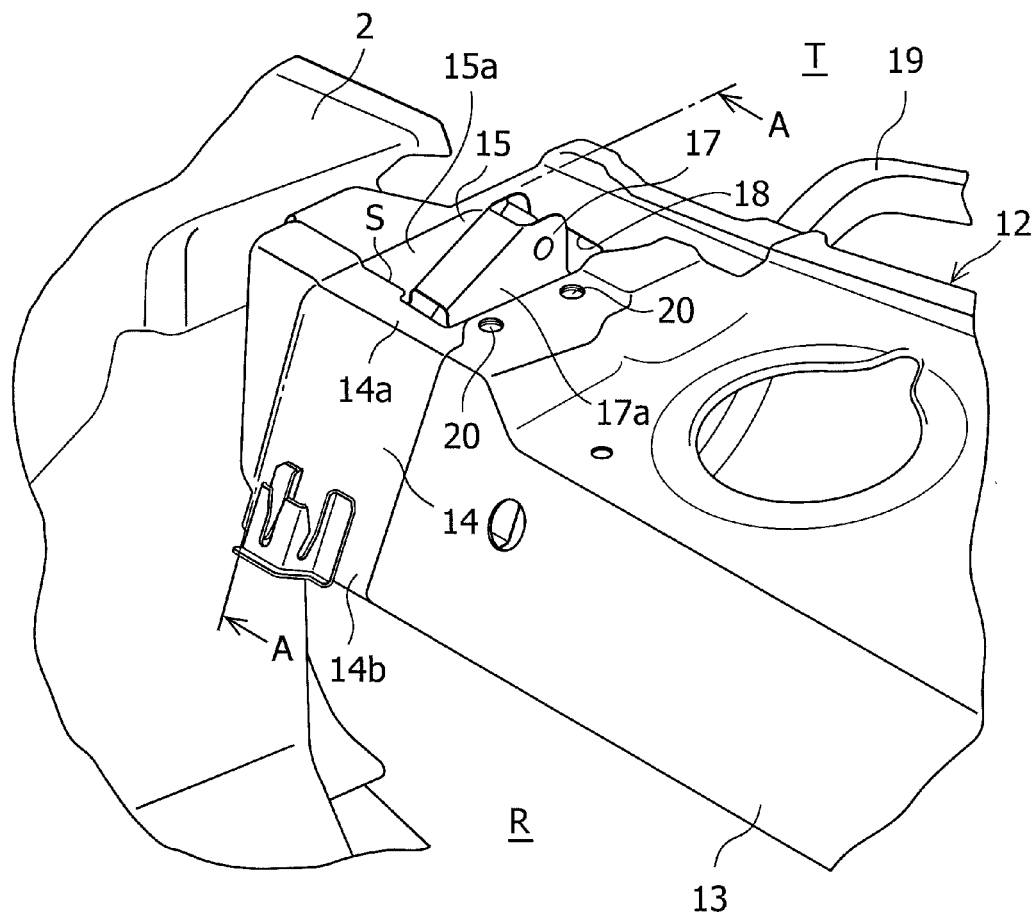
FIG. 2 is an enlarged perspective view showing a region X in FIG. 1.

The present invention will be described below in detail based on an illustrated embodiment.

FIG. 1 to FIG. 6 show a structure of a partition side member according to an embodiment of the present invention.

As shown in FIG. 1 to FIG. 6, a vehicle according to the embodiment of the present invention is an automobile of a four-door sedan type equipped with a seat belt apparatus 1 configured to hold a passenger on a backseat. A side vehicle body structure of the vehicle of this type includes a quarter inner panel 2, a quarter outer panel 3, a rear pillar panel 4, and a wheel house inner panel 5, which form a side vehicle body of the vehicle by extending in a vehicle front-rear direction and a vehicle vertical direction.

The seat belt apparatus 1 includes a retractor 7 configured to rewind a rear seat belt 6, and a seat belt guide 8 configured to guide and support an intermediate position of the rear seat belt 6 to be unwound upward from the retractor 7. The retractor 7 and the seat belt guide 8 are provided on a side vehicle body inside a vehicle interior in order to hold a body of a passenger with the rear seat belt 6.

A quarter inner reinforcement 9 to be expanded and bent in the width direction and the vertical direction of the vehicle is joined and disposed on the outside in a position on the rear side of the vehicle of the quarter inner panel 2. A bolt attaching portion (a suspending portion) 11 for an attachment bolt 10 configured to attach the seat belt guide 8 is provided on the quarter inner panel 2 where the quarter inner reinforcement 9 is located.

A partition side member 12 of this embodiment is located below the quarter inner reinforcement 9. As shown in FIG. 2 to FIG. 6, the partition side member 12 includes a partition panel 13 provided so as to partition an opening between a vehicle interior R at a rear part of the vehicle body and a trunk compartment (a luggage compartment) T, front and rear partition side panels 14 and 15 to be joined to both the right and left sides (both sides in the vehicle width direction) of the partition panel 13, and a partition reinforcement 16 to be joined to backsides (the rear side of the vehicle) of the partition panel 13 and the front and rear partition side panels 14 and 15. The partition panel 13 extends in the vehicle width direction and is formed into a bent shape in a "dogleg fashion" such that an intermediate portion in the vehicle front-rear direction protrudes upward.

As shown in FIG. 2 to FIG. 6, the front and rear partition side panels 14 and 15 are divided into two pieces in the vehicle front-rear direction and are disposed in shapes along the partition panel 13 in the vehicle front-rear direction. Overlapped portions of these side panels are joined to each other. Of these panels, an intermediate portion in the vehicle front-rear direction of the front partition side panel 19 is bent obliquely downward, whereby a rear end of a rear portion extending horizontally toward the rear part of the vehicle is formed as a rear joining flange 14a while a lower end of a front portion inclined downward relative to the vehicle is formed as a front joining flange 14b.

On the other hand, a front portion of the rear partition side panel 15 is formed as a front joining flange 15a extending horizontally frontward relative to the vehicle while a lower end of an inclined portion which is inclined from a front end of the front joining flange 15a downward relative to the vehicle is formed as a lower joining flange 15b.

Accordingly, the rear joining flange 14a of the front partition side panel 14 is superposed on and joined to an upper surface of the front joining flange 15a of the rear partition side panel 15. Specifically, a dividing line S for dividing the front partition side panel 14 from the rear partition side panel 15 extends in the vehicle width direction while being located on a substantially horizontal plane between the rear joining flange 14a and the front joining flange 15a that constitute joining portions of the side panels 14 and 15.

Here, an end in the vehicle width direction of the rear partition side panel 15 is joined to an intermediate portion in the vertical direction of the quarter inner panel 2. Meanwhile, a lower end on a front side of the quarter inner reinforcement 9 is joined to ends in the vehicle width direction of the front partition side panel 14 and the rear partition side panel 15. Furthermore, a rear end of the quarter inner reinforcement 9 extends to a joining portion of the quarter inner panel 2 and the quarter outer panel 3. The rear end of the quarter inner reinforcement 9, the quarter inner panel 2, and the quarter outer panel 3 are overlapped in three layers and joined to one another by spot welding.

Figure 3:
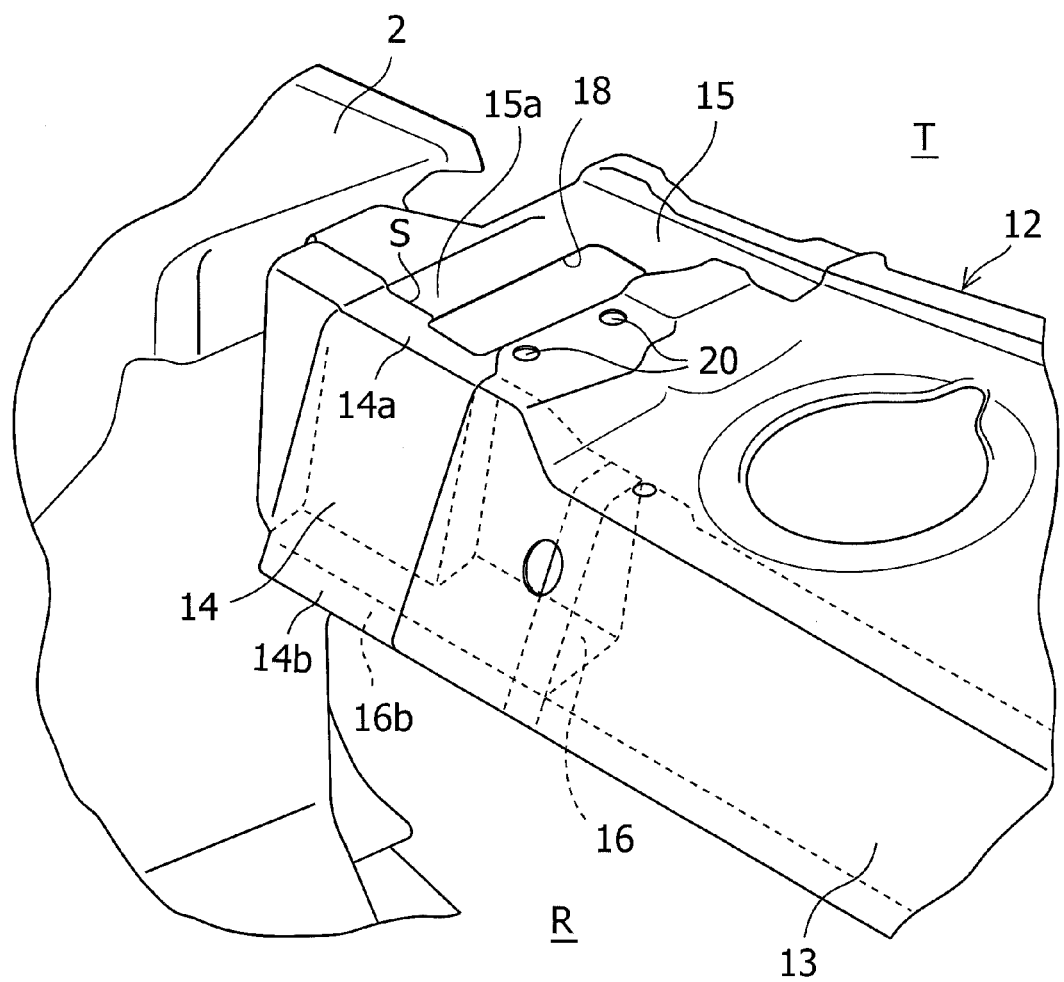
FIG. 3 is a perspective view, related to FIG. 2, which shows a state before attaching a trunk hinge bracket.
Figure 4:
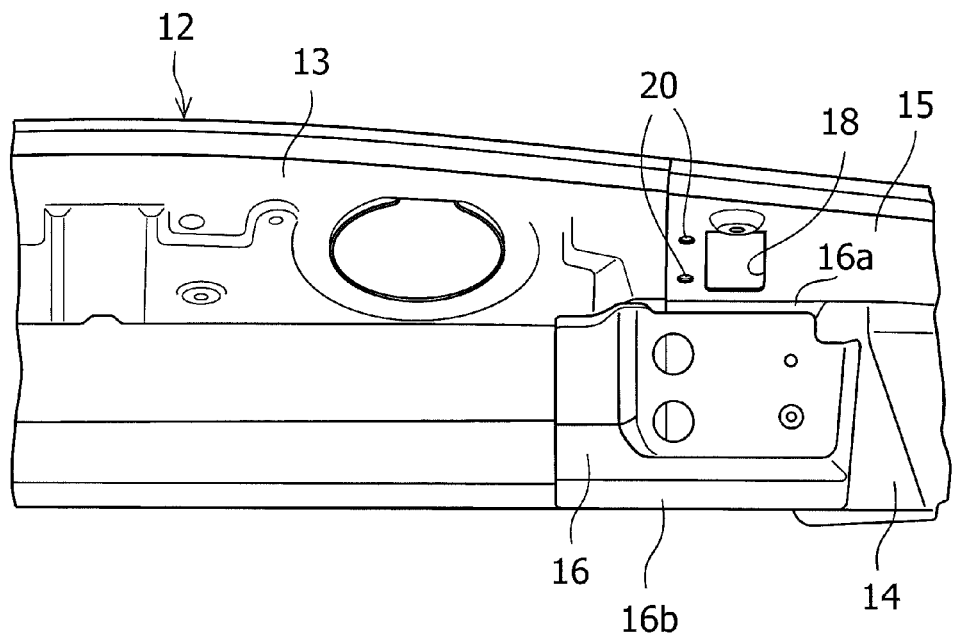
FIG. 4 is a perspective view, related to FIG. 3, which shows backsides of a partition panel and partition side panels in a state of attaching a partition reinforcement, viewed from the rear of a vehicle body.
Figure 5:
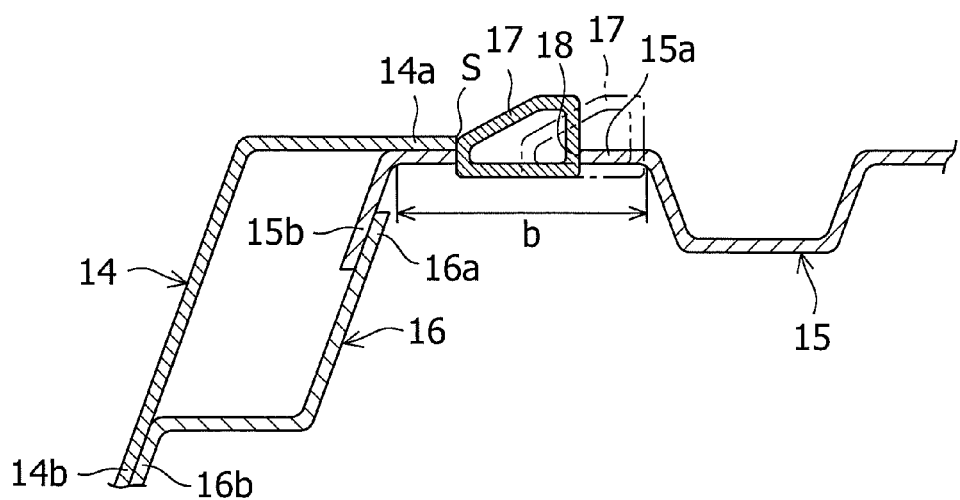
FIG. 5 is a cross-sectional view taken along an A-A line in FIG. 2.
Figure 6:
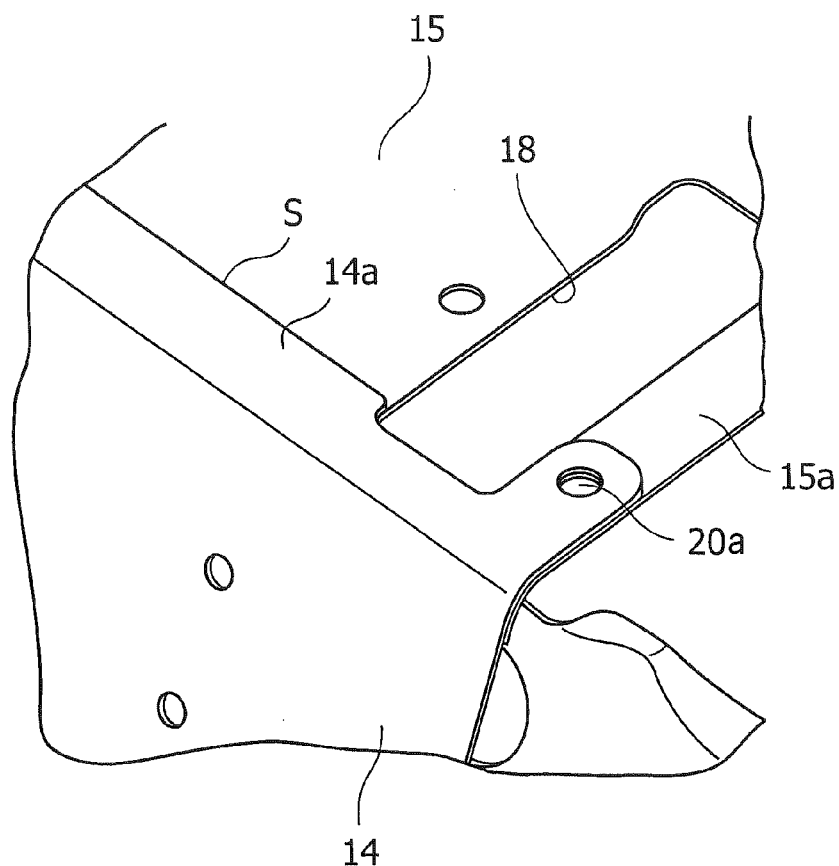
FIG. 6 is an enlarged perspective view, related to FIG. 3, which shows an attaching portion of the trunk hinge bracket.

As shown in FIG. 3 to FIG. 5, the partition reinforcement 16 of this embodiment is bent substantially into a crank-like sectional shape in the vehicle front-rear direction. An upper end extending obliquely upward from a rear end of a horizontal portion in the middle is formed as a rear joining flange 16a while a lower end of a front portion inclined obliquely downward from a front end of the horizontal portion in the middle is formed as a front joining flange 16b. Moreover, the rear joining flange 16a and the lower joining flange 15b are spot-welded to an upper part of the partition reinforcement 16 which is joined to a front portion of the rear partition side panel 15. Meanwhile, the front joining flange 16b and the front joining flange 14b are spot-welded to a lower part of the partition reinforcement 16 which is joined to a front lower portion of the front partition side panel 14.

Moreover, in the partition side member 12 of this embodiment, the partition panel 13 and the front partition side panel 14 are joined to each other at mutually adjacent portions on both the right and left sides in the vehicle width direction of the partition panel, and the partition panel 13 and the rear partition side panel 15 are joined to each other at mutually adjacent portions on both the right and left sides in the vehicle width direction of the partition panel. In addition, the partition panel 13 and the partition reinforcement 16 are joined to each other at mutually adjacent portions on both the right and left sides in the vehicle width direction of the partition panel.

Furthermore, as shown in FIG. 2 to FIG. 6, a through hole 18 for locating a trunk hinge bracket 17 is provided across the dividing line S between the front partition side panel 14 and the rear partition side panel 15. The through hole 18 is formed in a rectangular shape in a plan view having a larger length in the vehicle front-rear direction by forming a shallow notch at a portion on the rear side of the front partition side panel 14 toward the front side of the vehicle, forming a deep notch at a portion on the front side of the rear partition side panel 15 toward the rear side of the vehicle, and causing these notches to abut each other in the vehicle front-rear direction.

Note that the trunk hinge brackets 17 are provided on both the right and left sides of the partition side member 12. Each trunk hinge bracket 17 includes a pair of upright opposed walls 17a. The trunk hinge bracket 17 is configured to rotatably support a trunk door (not shown) by attaching a tip end of a trunk door hinge 19 to a hinge pin (not shown) disposed between the opposed walls 17a.

Meanwhile, a bolt hole 20a serving as an attaching portion for the trunk hinge bracket 17 is provided at an overlapped portion of the joining portions of the front partition side panel 14 and the rear partition side panel 15 located at a peripheral portion of the through hole 18 and on the inside in the vehicle width direction. In addition, another bolt hole 20 serving as another attaching portion for the trunk hinge bracket 17 is provided at an overlapped portion of the joining portions of the partition panel 13 located on the outside in the vehicle width direction and the rear partition side panel 15 located on the inside in the vehicle width direction, at the peripheral portion of the through hole 18. Accordingly, the trunk hinge bracket 17 is configured to be fixed to the partition side member 12 by locating a lower flange at the peripheral portion of the through hole 18 and inserting and tightening clamping bolts (not shown) into the bolt holes 20 and 20a formed on the three-layered panels.

As described above, the structure of the partition side member 12 according to the embodiment of the present invention includes the partition panel 13 configured to partition a space between the vehicle interior R at the rear part of the vehicle body and the trunk compartment T, the front and rear partition side panels 14 and 15 joined to both the right and left sides of the partition panel 13 and divided into two pieces in the vehicle front-rear direction, and the partition reinforcement 16 to be joined to the backsides of the partition panel 13 as well as the front and rear partition side panels 14 and 15. Here, the dividing line S between the front and rear partition side panels 14 and 15 extends in the vehicle width direction while being located on the substantially horizontal plane between the rear joining flange 14a and the front joining flange 15a that constitute the joining portions of the front and rear partition side panels 14 and 15. The upper part of the partition reinforcement 16 is joined to the front portion of the rear partition side panel 15 by spot welding the rear joining flange 16a and the lower joining flange 15b which overlap. Meanwhile, the lower part of the partition reinforcement 16 is joined to the lower portion of the front partition side panel 14 by spot welding the front joining flange 16b and the front joining flange 14b which overlap.

Figure 7:
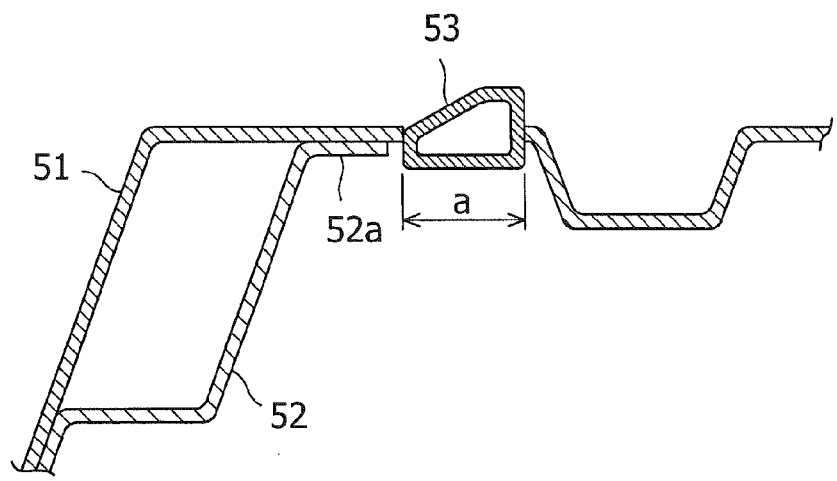
FIG. 7 is a cross-sectional view showing a partition side member of a conventional structure.

Therefore, according to the structure of this embodiment, a joining portion of the partition reinforcement 16 does not interfere with the trunk hinge bracket 17 installed on the front and rear partition side panels 14 and 15, and a distance b (see FIG. 5) of the substantially horizontal plane where the joining portion of the front and rear partition side panels 14 and 15 is located can be secured larger than a distance a (see FIG. 7) in the conventional structure. Accordingly, the trunk hinge bracket 17 of the structure of this embodiment indicated by a solid line can be installed on the horizontal plane between the partition side panels 14 and 15 in a position relatively closer to the front side of the vehicle as compared to the conventional structure indicated with a chain line. Thereby, flexibility of a hinge layout can be increased greatly while joint rigidity of the partition reinforcement 16 is secured.

In addition, the structure of this embodiment can achieve improvement in rigidity around the closed cross section by setting only the plate thickness of the front partition side panel 14 to a large value. Therefore, it is possible to avoid a weight increase as compared to the case of increasing the plate thickness of the entire panels around the closed cross section and to firmly join the member extending in the vehicle width direction to the vehicle side member by joining the front partition side panel 14 having the large plate thickness to the quarter inner panel 2 at the side vehicle body. Therefore, rigidity of the vehicle body can be improved.

Moreover, according to the structure of the partition side member 12 of this embodiment, the partition panel 13 and the front and rear partition side panels 14 and 15 are joined to one another at the mutually adjacent portions on both sides in the vehicle width direction. Meanwhile, the partition panel 13 is joined to the partition reinforcement 16 on both sides in the vehicle width direction. Therefore, each of the four components, that is, the partition panel 13, the front and rear partition side panels 14 and 15, and the partition reinforcement 16, is joined to the other three components. Therefore, according to the structure of this embodiment, it is possible to further enhance joint rigidity while securing the design flexibility of the trunk hinge bracket 17.

Furthermore, according to the structure of the partition side member 12 of this embodiment, the through hole 18 for installing the trunk hinge bracket 17 is provided across the dividing line S between the front partition side panel 14 and the rear partition side panel 15. Therefore, joint rigidity of the configuration of the closed cross section is secured by joining the partition reinforcement 16 to either the front partition side panel 14 or the rear partition side panel 15. Accordingly, the trunk hinge bracket 17 can be installed closer to the front side of the vehicle without any problems even when joint rigidity between the front partition side panel 14 and the rear partition side panel 15 is reduced. Therefore, the design flexibility of the hinge can be increased.

Meanwhile, according to the structure of the partition side portion 12 of this embodiment, the attaching portion for the trunk hinge bracket 17 is proved at the overlapped portion of the rear joining flange 14a of the front partition side panel 14 and the front joining flange 15a of the rear partition side panel 15. Therefore, the flange of the trunk hinge bracket 17 can be fixed in the three-layered state by fixation with the bolt using the through hole 18 provided at the two-layered joining portion. Accordingly, joining strength between the front partition side panel 14 and the rear partition side panel 15 is increased. Therefore, it is possible to improve joint rigidity of the members surrounding the closed cross section and to secure rigidity of a bearing surface of the bolt as well as attachment rigidity of the trunk hinge bracket 17.

In addition, according to the structure of the partition side member 12 of this embodiment, the attaching portion for the trunk hinge bracket 17 is provided at the joining portion of the partition panel 13 and the rear partition side panel 15. Therefore, it is possible to enhance attachment rigidity on the inside in the vehicle width direction at the rear part of the vehicle of the trunk hinge bracket 17 together with securing attachment rigidity on the inside in the vehicle width direction at the front part of the vehicle of the trunk hinge bracket 17. Thus, it is possible to receive loads at the time of opening and closing operations of the trunk door by use of attachment rigidity of the hinge bracket 17 in the vehicle front-rear direction. Accordingly, the loads at the time of opening and closing operations of the door can be absorbed efficiently.

Although the embodiment of the present invention has been described above, it is to be understood that the invention is not limited only to the embodiment stated herein but various modifications and changes can be made based on the technical scope of the invention.

For example, the shape of the through hole 18 in the above-described embodiment is formed in a rectangular shape which is elongated in the vehicle front-rear direction. However, it is also possible to select other appropriate shapes depending on the shape of the trunk hinge bracket 17, etc.

What is claimed is:

1. A partition side member structure comprising:
a partition panel provided to partition a space in a vehicle interior and a luggage compartment;
partition side panels respectively joined to both the right and left sides of the partition panel; and
a partition reinforcement joined to backsides of the partition panel and the partition side panels,
wherein the partition side panels are each divided in a vehicle front-rear direction into two partition side panels, which are front and rear partition side panels, by a dividing line extending in a vehicle width direction on a substantially horizontal plane formed of joining portions of the front and rear partition side panels,
wherein an upper part of the partition reinforcement is joined to a front portion of the rear partition side panel bent downward and a lower part of the partition reinforcement is joined to a lower portion of the front partition side panel bent downward, and
wherein an attaching portion for a hinge bracket is provided at an overlapped portion of the joining portions of the front partition side panel and the rear partition side panel.

2. The structure of a partition side member according to claim 1,
wherein the partition panel and the front partition side panels are joined together at their adjacent portions on both sides in the vehicle width direction of the partition panel,
wherein the partition panel and the rear partition side panels are joined together at their adjacent portions on both the sides in the vehicle width direction of the partition panel, and
wherein the partition panel and the partition reinforcement are joined together on both the sides in the vehicle width direction of the partition panel.

3. The structure of a partition side member according to claim 1,
wherein the attaching portion for the hinge bracket is provided at joining portions of the partition panel and the rear partition side panel.

4. A partition side member structure comprising:
a partition panel provided to partition a space in a vehicle interior and a luggage compartment;
partition side panels respectively joined to both the right and left sides of the partition panel; and
a partition reinforcement joined to backsides of the partition panel and the partition side panels,
wherein the partition side panels are each divided in a vehicle front-rear direction into two partition side panels, which are front and rear partition side panels, by a dividing line extending in a vehicle width direction on a substantially horizontal plane formed of joining portions of the front and rear partition side panels,
wherein an upper part of the partition reinforcement is joined to a front portion of the rear partition side panel bent downward and a lower part of the partition reinforcement is joined to a lower portion of the front partition side panel bent downward,
wherein a hole for installing a hinge bracket is provided across the dividing line between the front partition side panel and the rear partition side panel, and
wherein an attaching portion for the hinge bracket is provided at an overlapped portion of the joining portions of the front partition side panel and the rear partition side panel.

5. The structure of a partition side member according to claim 4,
wherein the partition panel and the front partition side panels are joined together at their adjacent portions on both sides in the vehicle width direction of the partition panel,
wherein the partition panel and the rear partition side panels are joined together at their adjacent portions on both the sides in the vehicle width direction of the partition panel, and
wherein the partition panel and the partition reinforcement are joined together on both the sides in the vehicle width direction of the partition panel.

6. The structure of a partition side member according to claim 4,
wherein an overlapping portion of the joining portion between the partition panel and the rear partition side panel is located at a peripheral portion of the hole for installing the hinge bracket and on the inside in the vehicle width direction.

7. The structure of a partition side member according to claim 4,
wherein the attaching portion for the hinge bracket is provided at joining portions of the partition panel and the rear partition side panel.

8. A partition side member structure comprising:
a partition panel provided to partition a space in a vehicle interior and a luggage compartment;
partition side panels respectively joined to both the right and left sides of the partition panel; and
a partition reinforcement joined to backsides of the partition panel and the partition side panels,
wherein the partition side panels are each divided in a vehicle front-rear direction into two partition side panels, which are front and rear partition side panels, by a dividing line extending in a vehicle width direction on a substantially horizontal plane formed of joining portions of the front and rear partition side panels,
wherein an upper part of the partition reinforcement is joined to a front portion of the rear partition side panel bent downward and a lower part of the partition reinforcement is joined to a lower portion of the front partition side panel bent downward,
wherein an attaching portion for a hinge bracket is provided at an overlapped portion of the joining portions of the front partition side panel and the rear partition side panel, and
wherein an overlapping portion of the joining portion between the partition panel and the rear partition side panel is located at a peripheral portion of a hole for installing the hinge bracket and on the inside in the vehicle width direction.

9. The structure of a partition side member according to claim 8,
wherein the partition panel and the front partition side panels are joined together at their adjacent portions on both sides in the vehicle width direction of the partition panel,
wherein the partition panel and the rear partition side panels are joined together at their adjacent portions on both the sides in the vehicle width direction of the partition panel, and wherein the partition panel and the partition reinforcement are joined together on both the sides in the vehicle width direction of the partition panel.

10. The structure of a partition side member according to claim 8,
wherein the attaching portion for the hinge bracket is provided at joining portions of the partition panel and the rear partition side panel.

* * * * *